Patented Nov. 2, 1943

2,333,093

UNITED STATES PATENT OFFICE 2,333,093

COSMETIC PREPARATION

Frederick E. Dearborn, Washington, D. C.

No Drawing. Application March 3, 1939,
Serial No. 259,591

4 Claims. (Cl. 167—91)

(Granted under the act of March 3, 1883, as
amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to cosmetic preparations utilizing sulphur compounds of the aliphatic unsaturated monocarboxylic acids, their glycerides, and their mono-hydric esters. It is a well-known fact that preparations containing uncombined or colloidal sulphur are valuable in the treatment of certain skin disorders such as acne, seborrhea, and other skin ailments. This invention is an improvement over these preparations as the sulphur is in chemical union with a vegetable or animal oil or fat and consequently is easily absorbed by the skin, hair, or scalp. I have found that sulphur can be made to chemically combine with an aliphatic unsaturated monocarboxylic acid or its glyceride without the removal of hydrogen from the molecule. The sulphur saturates the double bond or bonds in the acid molecule, forming a series of new acids. Acids of the oleic series, $C_nH_{2n-2}O_2$, containing one double bond combines with one atom of sulphur to form the new acid series $C_nH_{2n-2}SO_2$. Acids of the linoleic series, $C_nH_{2n-4}O_2$, containing two double bonds, form two series of acids, namely, the mono- and the di-, represented by the formulas $C_nH_{2n-4}SO_2$ and $C_nH_{2n-4}S_2O_2$, respectively. Acids of the linolenic series, $C_nH_{2n-6}O_2$, containing three double bonds form three series of acids, the mono-, the di-, and the tri-, represented by the formulas $C_nH_{2n-6}SO_2$, $C_nH_{2n-6}S_2O_2$, and $C_nH_{2n-6}S_3O_2$, respectively. Comparable series are indicated for acids containing more than three double bonds in their molecule. The addition of the sulphur to the double bond may be illustrated by the following indicated reaction between oleic acid and sulphur:

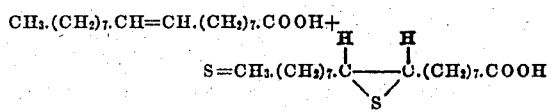

In carrying out my invention I prefer to heat the aliphatic unsaturated monocarboxylic acid, its glyceride, or a vegetable or animal oil or fat containing glycerides of unsaturated fatty acids, with sulphur at a temperature up to 200° C., using iodine as a catalyst. Heating is preferably accomplished by any indirect means, such as in a suitable bath, to prevent local superheating with subsequent decomposition. Iodine as a catalyst is preferably added when the temperature has reached 160° C. and most of the sulphur has been dissolved by the acid or oil. The iodine acts as a sulphur carrier causing the sulphur to add to the double bond, saturating it when there is sufficient present. A slight excess of sulphur is generally used as some loss by sublimation develops during the heating. A slow agitation is maintained throughout the process. A somewhat lighter product is obtained if the reactants are blanketed by carbon dioxide or nitrogen during the heating and cooling process. The reaction is completed in about one hour, the reactants being kept at 190–200° C. for half an hour. All of the sulphur compounds should be thoroughly washed and purified before using in the preparations of cosmetics, to remove harmful ingredients, such as those which develop acidity, and so forth. The sulf-acids and the sulf-glycerides are of a reddish brown color and they are slightly more viscous than the parent compounds. The sulf-glycerides may be saponified by the usual methods without the removal of the combined sulphur from the molecule of the acids. When an alkali is used in saponification the sulf-acids may be obtained by decomposing the soap solution with a dilute mineral acid. The sulf-acids may be converted to the sulf-esters by refluxing in the usual way with anhydrous alcohol, using concentrated sulphuric acid as a catalyst. The sulf-glycerides may also be converted to an ester of a monohydric alcohol by refluxing with an anhydrous alcohol in the same manner as the sulf-acids. The esters are reddish brown in color and much less viscous that the parent sulf-acids or sulf-glycerides.

Vegetable and animal oils and fats containing considerable amounts of the glycerides of the unsaturated monocarboxylic acids may be used in preparing my cosmetics. The amount of sulphur that an oil or fat will chemically add can be approximately calculated from its composition. —9—10 mono sulphur octadecanoic acid contains 10.2% of sulphur, di-sulflinoleic acid contains 18.6% sulphur, and tri-sulflinolenic acid contains 25.7% sulphur. Olive oil, for instance, contains approximately 84.4% oleic acid and 3.9% linoleic acid, hence the oil will combine with approximately 9.3% by weight of sulphur. In the following table are listed a few oils with their approximate percent by weight of combining sulphur.

| | Per cent |
|---|---|
| Olive oil | 9.3 |
| Castor oil | 9.7 |
| Peanut oil | 10.2 |
| Rapeseed oil | 10.2 |
| Cottonseed oil | 10.7 |
| Sesame oil | 11.2 |
| Almond oil | 11.6 |
| Corn oil | 11.7 |
| Soya bean oil | 13.0 |

The following is intended to define and to illustrate this invention but in no way to limit it to the reagents, proportions, or conditions described.

HAIR TONICS

Sulf-castor oil is better adapted for preparations requiring extensive solubility in ethyl alcohol as it is more soluble than most of the other sulf-glycerides. Castor oil is mainly composed of the glycerides of ricinoleic acid which is an unsaturated hydroxy acid, the hydroxyl group rendering the compound more soluble. The sulf-monohydric esters are also soluble in alcohol and may be used in hair tonics.

Example 1

100 grams of refined castor oil is heated with from 1 to 10 grams of flowers of sulphur, depending upon the sulphur content desired, to 190-200° C., using iodine as a catalyst, and held at this temperature for half an hour. Carbon dioxide or nitrogen may be introduced over the oil while heating and cooling to give a lighter colored product than otherwise. The cooled sulf-castor oil is thoroughly washed with water to remove any soluble acids and then dried. From 10 to 25% by weight of the sulf-castor oil thus prepared may be dissolved in 99% neutral ethyl alcohol to produce a hair preparation.

Example 2

100 grams of sulf-olive oil is refluxed with 300 grams of anhydrous ethyl alcohol using 20 cc. of concentrated sulphuric acid as a catalyst, until esterification has taken place. The reactants are poured into water. The oily layer is then separated and well washed to remove all traces of acid and finally dried. From 10 to 30% by weight may be dissolved in 99% ethyl alcohol to form a hair tonic.

SHAMPOOS

Shampoos are prepared by reacting an organic base such as the amines with a sulf-acid or a mixture of the sulf-acids obtained by saponifying a sulphurized animal or vegetable oil, to produce a preparation possessing high detergent and cleansing properties free from alkali metal salts.

Example 1

100 grams of the sulf-acids obtained from the saponification of sulf-olive oil are exactly neutralized with triethanolamine to produce a shampoo preparation. This material is diluted with the desired amount of water.

Example 2

100 grams of -9-10 mono sulphur octadecanoic acid are neutralized with the mono- or the diethanolamine to form a neutral preparation. The product is diluted with the desired amount of water.

CREAMS

Creams of various kinds and of various consistencies can be made from the sulf-acids, the sulf-glycerides, and the sulf-esters. The sulf-esters and the sulf-oils, which have been refluxed with anhydrous alcohol, and a strong inorganic acid as a catalyst, make thinner creams than the sulf-oils and sulf-glycerides. The sulf-acids are converted to the sulf-esters by refluxing with anhydrous alcohol in the presence of a strong mineral acid, such as concentrated sulphuric acid. All of the sulphur compounds are reddish brown in color, the sulf-esters, however, being somewhat lighter in color.

Example 1

The following formula has been found highly desirable as a cleansing cream:

| | | |
|---|---|---|
| Anhydrous lanolin | grams | 4.6 |
| Paraffin wax | do | 4.6 |
| Beeswax | do | 11.3 |
| Ethyl-9-10 mono sulphur octadecanoate | do | 55.0 |
| Glycerol | do | 5.0 |
| Distilled water | cc | 35 |

The lanolin, paraffin wax, beeswax, ethyl-9-10 mono sulphur octadecanoate, and glycerol are heated on a water bath until all of the waxes have become molten and a uniform oil produced, then the water is slowly added and emulsified by whipping with cooling. Perfumes may be added during the whipping process.

Example 2

A heavier cream is prepared by substituting sulf-olive oil in place of the ethyl-9-10 mono sulphur octadecanoate in the above example.

All of the above products may be perfumed or otherwise treated to make a more desirable product.

Having thus described my invention, I claim:

1. A neutral cosmetic preparation comprising sulfurized castor oil dissolved in a mono-hydric alcohol.

2. A neutral cosmetic preparation comprising the product resulting from esterifying sulfurized olive oil with mono-hydric alcohol.

3. A neutral cosmetic preparation comprising an aqueous emulsion of ethyl-9-10 mono sulfur octadecanoate, beeswax, paraffin wax, and lanolin.

4. A cosmetic preparation comprising an aqueous emulsion of neutralized sulfurized olive oil, beeswax, paraffin, and lanolin.

FREDERICK E. DEARBORN.